United States Patent Office 2,722,209
Patented Nov. 1, 1955

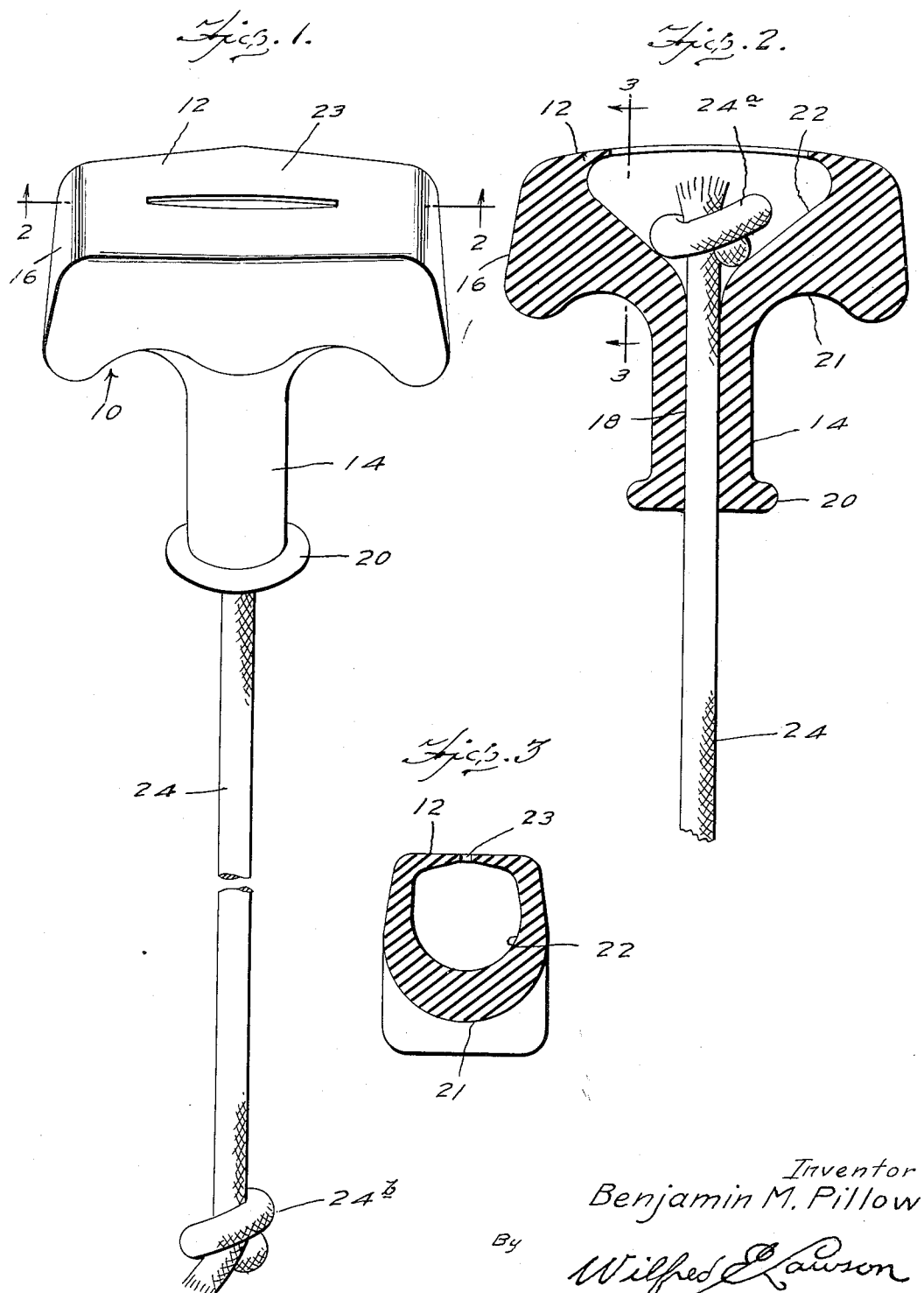

2,722,209
STARTER ROPE HANDLE
Benjamin M. Pillow, Dyersburg, Tenn.

Application February 26, 1954, Serial No. 412,823

1 Claim. (Cl. 123—185)

This invention relates generally to handle and crank devices and is directed particularly to an improved handle for use with a starter rope.

Starter ropes are used commonly for starting or cranking small gas motors, such as those used on lawn mowers, outboard motors and the like and such ropes are attached to some type of handle, at one end so that a firm grip can be obtained on the rope to apply the desired pull thereto.

The present invention has for a principal object to provide an improved type of handle in which a knotted end of a starter rope can be easily and quickly secured, in a cavity in the handle, without employing fastening screws, cover plates or plugs for the handle cavity, or other securing devices.

A further and more specific object of the invention is to provide a handle for a starter rope, wherein the handle is formed in one piece of a relatively hard rubber or similar material such as a suitable plastic, which is provided with an opening or socket leading through a stem or shank and which socket is accessible through a slot in the top of the handle which, due to the flexibility or resiliency of the material of which the handle is formed, automatically closes itself after the rope has been positioned in the cavity.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modification will occur to a person skilled in the art.

In the drawings:

Figure 1 is a view in perspective of a starter rope handle constructed in accordance with the present invention and showing a rope attached thereto.

Figure 2 is a sectional view taken substantially on the line 2—2 of Figure 1.

Figure 3 is a transverse section taken substantially on the line 3—3 of Figure 2.

Referring more particularly to the drawing the present improved starter rope handle is generally designated 10 and comprises a top or head portion 12 and a shank portion 14.

As shown the head portion 21 is of elongate rectangular form with each of its end faces 16 inclined slightly outwardly and downwardly from the top face.

Extending from the under side of the body or head portion 12 at the transverse center, is the integral stem portion 14 which is preferably of circular form and has a longitudinal passage 18 therethrough so that the stem is tubular as illustrated in Figure 2.

The lower end of the stem 14 is surrounded by the solid rib 20 and the underside of the head portion 12 in the portions between the stem 14 and the end faces 16, is undercut as indicated at 21 to facilitate grasping the head, the undercut portions or recesses being designed to receive fingers of the hand grasping the head portion 12.

The head portion 12 is formed, as by molding or the like, with a socket or recess 22 which joins the passage 18 as shown in Figure 2 and this socket or recess 22 is covered by a thin portion of the material of which the handle is formed thereby providing a thin top wall which has a slit 23 formed therethrough longitudinally of the handle.

Since the handle body is formed of rubber or of similar resilient material it will be seen that by compressing the head portion 12 from its two ends the slit 23 can be caused to open so that an end of a starter rope can be inserted and run through the tubular stem 14, or the rope can have its free end started through the end of the tubular stem and run into the socket 22 and then through the slot 23 to receive a knot.

In Figures 1 and 2 the numeral 24 designates a starter rope which has an end extended through the tubular stem 14 and into the socket where such end is shown provided with a knot 24a which prevents the end of the rope being pulled out of the socket.

The opposite end of the rope is provided with a knot 24b, in the conventional manner, to facilitate its attachment to the fly wheel of the motor which is to be started.

It will be readily apparent that if the knot 24a is first formed on the end of the rope then the other end can be passed through the slot 23 and through the tubular stem and the knotted end can then be drawn into the socket or the unknotted end can be run through the lower end of the stem 14 and through the socket and the slit 23 and then knotted and pulled back into the socket in the manner shown.

From the foregoing it will be seen that there is provided an improved handle which requires no parts or covering for protecting the knotted end of the rope to hold it in position so that there are no movable parts to be lost or to bother with in inserting or replacing of the rope.

I claim:

A one piece starter rope handle comprising a body of resilient material, an elongated hand engaging head on said body, an elongated shank integral with said head and extending therefrom at substantially right angles, said head having a recess, said shank having an aperture extending therethrough and communicating with said recess whereby a starter rope extending through said aperture and provided with a knot on the end thereof disposed in said recess is retained in said handle against a pull exerted in one direction, a relatively thin wall integral with said head and closing said recess and a slit in the said wall, said slit providing access to said recess for the insertion of said knot and said slit being normally closed by the resiliency of said material.

References Cited in the file of this patent

UNITED STATES PATENTS

| | | |
|---|---|---|
| 2,348,547 | Kissel | May 9, 1944 |
| 2,564,787 | Mack | Aug. 21, 1951 |